US008261332B2

(12) United States Patent
Chen et al.

(10) Patent No.: US 8,261,332 B2
(45) Date of Patent: Sep. 4, 2012

(54) ESTABLISHING A TRUST RELATIONSHIP BETWEEN COMPUTING ENTITIES

(75) Inventors: Liqun Chen, Bristol (GB); Ahmad-Reza Sadeghi, Bochun (DE)

(73) Assignees: Hewlett-Packard Development Company, L.P., Houston, TX (US); Ruhr-University Bochum, Bochum (DE)

( * ) Notice: Subject to any disclaimer, the term of this patent is extended or adjusted under 35 U.S.C. 154(b) by 957 days.

(21) Appl. No.: 12/169,113

(22) Filed: Jul. 8, 2008

(65) Prior Publication Data

US 2009/0019285 A1 Jan. 15, 2009

(30) Foreign Application Priority Data

Jul. 9, 2007 (GB) .................................... 0713200.4

(51) Int. Cl.
*H04L 29/06* (2006.01)
(52) U.S. Cl. ................................ 726/5; 713/180; 380/44
(58) Field of Classification Search ...... 726/5; 713/175, 713/176, 179, 180; 380/44, 46
See application file for complete search history.

(56) References Cited

U.S. PATENT DOCUMENTS

2004/0123110 A1* 6/2004 Zhang et al. .................. 713/176
2006/0026423 A1* 2/2006 Bangerter et al. ............ 713/164

OTHER PUBLICATIONS

Abe, M., et al., "1-Out-Of-n Signatures from a Variety of Keys", Proceedings of Advances in Cryptology—ASIACRYPT 2002, LNCS vol. 2501, pp. 415-432, Springer-Verlag 2002.
Abe, M. et al., "1-out-of-n Signatures from a Variety of Keys", In Proceedings of Advances In Cryptology—ASIACRYPT 2002, LNCS vol. 2501, pp. 415-432. Springer-Verlag, 2002.
Brickell, E, et al., "Direct Anonymous Attestation", In B. Pfitzmann and P. Liu, Proceedings of 11th ACM Conference on Computer and Communicatons Security, pp. 132-145, ACM Press, Oct. 2004.
Camenisch, J., et al., "A Signature Scheme with Efficient Protocols", In S. Cimato, C. Galdi, and G. Persiano, Security in Communication Networks, Third International Conference, SCN 2002, LNCS 2576, pp. 268-289, Springer Verlag, 2003.
Chaum, D, et al., "Undeniable Signatures",. In Proceedings of Advances in Cryptology—CRYPTO '89, LNCS 435, pp. 212-216, Springer-Verlag, 1990.
Sadeghi, A., et al., "Property-based Attestation for Computing Platforms: Caring about properties, not mechanisms", Proceedings of the 2004 New Security Paradigms Workshop, AGM SIGSAC, ACM Press, Sep. 2004.

* cited by examiner

*Primary Examiner* — Edward Zee

(57) ABSTRACT

A first computing entity provides evidence to a second computing entity to demonstrate that the first computing entity has a trusted configuration specification that is one of a set of such specifications agreed between the computing entities. This evidence comprises a computed commitment, made using (but not revealing) the configuration specification of the first computing entity, and a ring signature generated using a plurality of keys where each such key is generated using the commitment and one of the trusted configuration specifications. The second computing entity verifies the ring signature in order to convince itself that the configuration specification of the first computing entity is in the set.

14 Claims, 5 Drawing Sheets

ESTABLISHING A TRUST RELATIONSHIP BETWEEN COMPUTING ENTITIES

FIELD OF THE INVENTION

The present invention relates generally to establishing a trust relationship between computing entities. The invention finds application in trusted computing environments, in particular, but not exclusively, wherein a trust relationship depends at least in part on a first computing entity demonstrating to or convincing a second computing entity that the former has a configuration that can be trusted by the second computing entity.

BACKGROUND OF THE INVENTION

A significant consideration in interaction between computing entities is trust—whether a foreign computing entity will behave in a reliable and predictable manner, or will be (or already is) subject to subversion. Trusted systems which contain a trusted device—often referred to as a Trusted Platform Module (TPM)—which is at least logically protected from subversion, have been developed by the companies forming the Trusted Computing Group (TCG). The TCG develops specifications in this area, for example the "TCG TPM Specification" Version 1.2, which is published on the TCG website. The implicitly trusted devices of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

The TCG has also developed specifications to enhance the architecture of common computing entities by means of new functionalities, amongst others so-called 'binary attestation', to verify the integrity of a remote computing entity. In brief, binary attestation measures all the (binary) code executed on the computing entity by using certain metrics (for example a cryptographic hash value over the code binary). The result is stored in special registers in the trusted device before executing the code. This procedure is bootstrapped starting with a kind of pre-BIOS that is trusted by default and measures the boot-loader, storing the result. This procedure can be used to build a so-called 'chain of trust', which can then be extended to the operating system components and to applications.

Binary attestation has, however, been reported to suffer some shortcomings. Binary attestation typically reveals information about the configuration of a computing entity or application. This information can be misused to discriminate against certain configurations (for example, operating systems) and even the corresponding vendors, or may be exploited to mount attacks.

One proposal to overcome these shortcoming is to transform the binary attestation into property-based attestation (PBA), as described in "Property-based Attestation for Computing Platforms: Caring about properties, not mechanisms" in The 2004 New Security Paradigms Workshop, Virginia Beach, Va., USA, September 2004. ACM SIGSAC, ACM Press. The basic idea here requires a computing entity to attest that it fulfils desired (security) requirements without revealing a respective specific software or/and hardware configuration. One concrete solution for such a PBA is described in "A Protocol for Property-Based Attestation", Liqun Chen, Rainer Landfermann, Hans Loehr, Markus Rohe, Ahmad-Reza Sadeghi, and Christian Stüble, the proceedings of the First ACM Workshop on Scalable Trusted Computing (STC'06), the ACM Press, 2006. The proposal provides a PBA protocol within an abstract model for the main functionalities provided by TCG-compliant computing entities. The protocol requires an off-line trusted third party (TTP) to publish a list of trusted configurations and respective certificates to attest that the configurations provide a specific property or properties. A first computing entity (a "prover") can use the signed configurations and certificates to prove to a second computing entity (a "verifier") that it has appropriate properties, without disclosing those properties.

Aspects and embodiments of the present invention aim to provide an alternative form of PBA.

SUMMARY OF THE INVENTION

According to one aspect of the present invention, there is provided a method of demonstrating to a second computing entity that a first computing entity has a trusted configuration specification, the method comprising:
  (a) the computing entities agreeing on a set of trusted configuration specifications, including a configuration specification of the first computing entity;
  (b) the first computing entity providing the second computing entity with evidence that its configuration specification is a member of the set, the said evidence comprising a computed commitment, made using (but not revealing) the configuration specification of the first computing entity, and a ring signature generated using a plurality of keys, each key being generated using the commitment and one of the trusted configuration specifications, of which one key is generated using the commitment and the configuration specification of the first computing entity; and
  (c) the second computing entity verifying the ring signature in order to convince itself that the configuration specification of the first computing entity is in the set.

According to other aspects and embodiment, the present invention also provides a computing platform, a system and a trusted device, as will be more fully described hereinafter.

Further features and advantages of the invention will become apparent from the following description of preferred embodiments of the invention, given by way of example only, which is made with reference to the accompanying drawings.

DETAILED DESCRIPTION OF THE INVENTION

Figure 1:
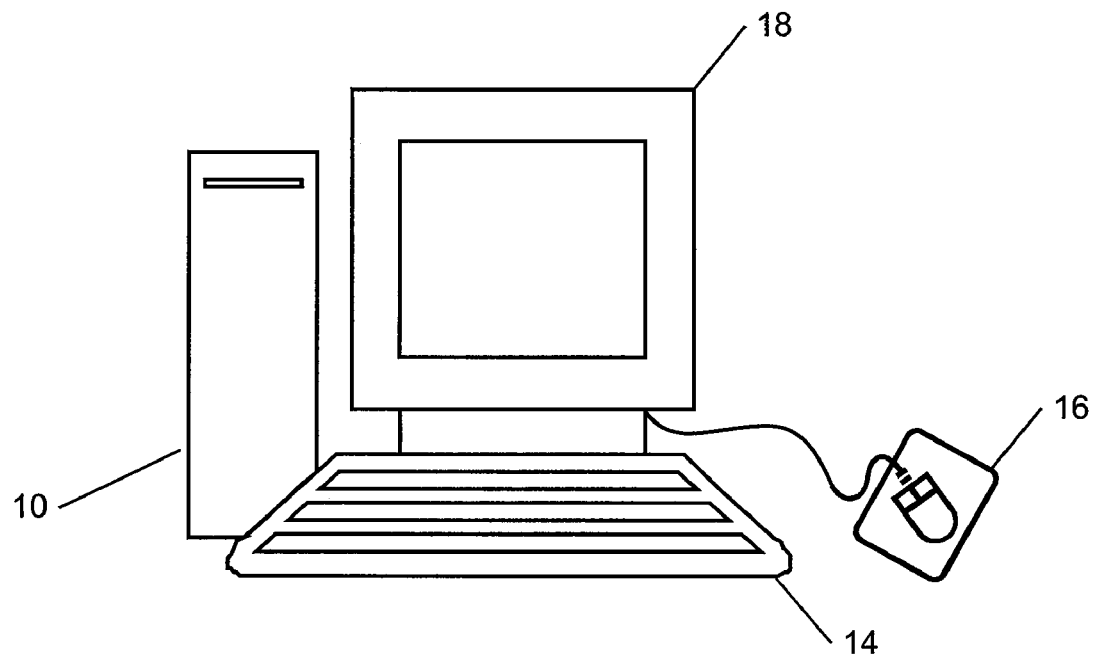
FIG. 1 is a diagram illustrating a trusted computing platform according to embodiments of the present invention.
Figure 4:
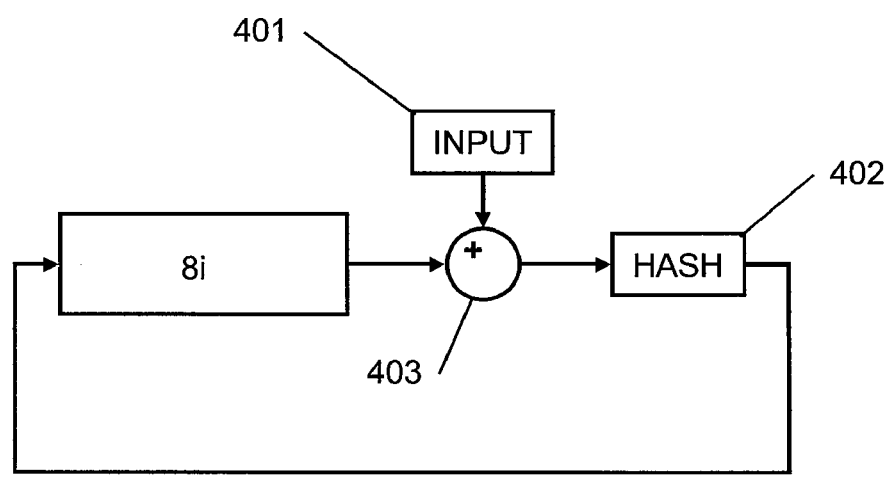
FIG. 4 is a schematic diagram of a function applied to integrity metrics by a trusted device according to embodiments of the present invention.

Before describing embodiments of the present invention, a trusted computing platform of a type generally suitable for carrying out embodiments of the present invention will be described with reference to FIGS. 1 to 4. This description of a trusted computing platform describes certain basic elements of its construction and operation. As used herein, the term "computing platform" is to be understood as encompassing any apparatus capable of effecting computation and is not limited to computers; for example, digital cellular equipment (including mobile telephones) and personal digital assistants (PDAs) have substantial computing capability and are within the scope of the term "computing platform". "Trust" is the expectation that a device will behave in a particular manner for a specific purpose. In addition, the term computing platform herein includes a virtual computing platform environment, which is substantially independent of (e.g. encapsulated or compartmentalised) other such computing environments, which all reside on a common physical computing platform. To a user, such an environment apparently behaves in exactly the same way as a standard, standalone computing platform, even down to the ability of the user to re-boot the platform: where a re-boot operation of a virtual computing platform re-boots only the resources available to the user in his environment (in other words, a re-boot operation would not have any effect on other users using other virtual computing platforms). A "user", in the present context, may be a local user or a remote user such as a remote computing entity.

A trusted computing platform is further described in the applicant's International Patent Application No. PCT/GB00/00528 entitled "Trusted Computing Platform" and filed on 15 Feb. 2000. The skilled person will appreciate that the present invention does not rely for its operation on use of a trusted computing platform as described herein: thus, although embodiments of the present invention are described with respect to a trusted computing platform, the skilled person will appreciate that aspects of the present invention may be employed with different types of computing platform and need not be based on trusted computing platform functionality.

A trusted computing platform (whether physical or virtual) according to embodiments of the present invention provides for trustable platform integrity measurement and reporting and to this end has a plurality of shielded locations, that is, places (memory, register, etc.) where it is safe to operate on sensitive data. Integrity measurement is the process of obtaining integrity metrics of a platform (that is, metrics of platform characteristics that affect the integrity (trustworthiness of the platform) and putting the metrics (here taken to encompass derivative values such as digests) into shielded locations (in TCG parlance, the shielded locations used for storing integrity metrics are referred to as Platform Configuration Registers or "PCRs" and this terminology will be used hereinafter); integrity reporting is the process of attesting to integrity metrics recorded in PCRs in a way that binds the metrics to the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform before exchanging data with the platform by requesting the trusted platform to provide one or more integrity metrics. The user receives the integrity metric or metrics, and compares them against values which it believes to be true (these values being provided by a trusted party ("TP") that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted.

Once a user has established trusted operation of the platform, he exchanges other data with the platform. For a local user, the exchange might be by interacting with some software application running on the platform. For a remote user, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform. Existing TCG trusted computer platforms are adapted to provide digests of software on the platform—these can be compared with publicly available lists of known digests for known software. This does however provide an identification of specific software running on the trusted computing platform. As has already been mentioned, this may be undesirable for the owner of the trusted computing platform on privacy and security grounds. As will be described below, aspects of the present invention may be used to improve the privacy and security position of the trusted computing platform owner.

In order to impart to a computing platform the characteristics of a trusted computing platform, it is necessary to provide the platform with certain inherently trustable functionalities (collectively making up what is herein referred to as a "trusted entity") which operate together with elements of the computing platform to provide the desired trusted characteristics. For trusted platforms following the TCG approach, the trusted entity is called a trusted platform module ("TPM") and serves to provide, together with elements of the computing platform to which the trusted entity is physically or logically bound, the following "roots of trust":

a root of trust for measurement (RTM),—the RTM is a computing engine capable of making inherently reliable integrity measurements and is typically the normal platform computing engine (main processor) controlled by a core root of trust for measurement (CRTM), that is the instructions executed by the platform when it acts as the RTM. The CRTM is logically part of the aforesaid trusted entity and would ideally be stored in the TPM but for cost reasons is usually stored in a separate ROM;

a root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" and 'sealed'/'unsealed' for access by the RTS against a particular environment (as indicated by PCR values); and a root of trust for reporting (RTR)—the RTR is a computing engine capable of reliably reporting information held by the RTS.

The trusted entity can be embodied as a hardware device (which may include a program-controlled processor) or in software for execution by a main processor of the platform (in which case it is often referred to as a 'virtual' trusted entity or in the case of a TPM, a virtual TPM). A hardware trusted entity is usually physically bound to the platform with which it is associated whereas a software trusted entity is logically bound to the platform with which it is associated. In practice, virtual trusted entities are usually provided on platforms that have a basic hardware trusted entity for the basic platform environment but further trusted entities are required for virtual environments created on the platform.

It is, of course, also possible to implement a trusted entity as a combination of hardware device and software intended for execution on the platform; this is suitable for example for the software implementation of higher-level features of the trusted entity (non core features) where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, most desirable implementations provide the trusted entity with protective features, to protect secrets stored by or being processed by the trusted entity by making them inaccessible to other platform functions, and provide an environment that is substantially immune to unauthorised modification.

For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality. Other measures would be known for protecting software-based implementations.

A trusted platform 10 is illustrated in the diagram in FIG. 1. The computing platform 10 is entirely conventional in appearance—it has associated the standard features of a keyboard 14, mouse 16 and visual display unit (VDU) 18, which provide the physical 'user interface' of the platform. The present embodiment is described in relation to a so-called personal computer, having operating under a Microsoft™ Windows™ operating system. However, the invention is in no way limited to one particular platform, and other platforms operating under Linux, UNIX™, HP-UX™, Solaris™, or indeed any other operating system, could equally operate according to embodiments of the present invention.

Figure 2:
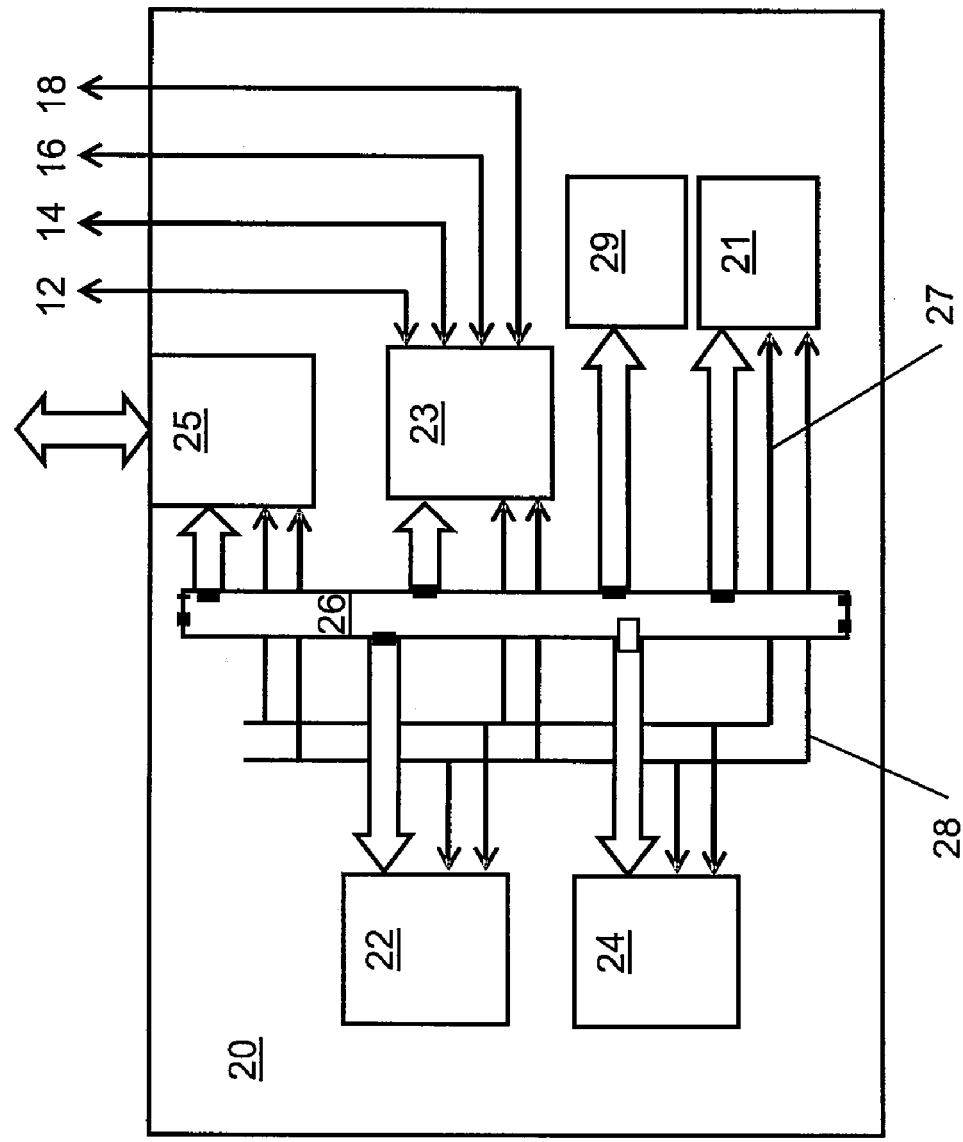
FIG. 2 is a schematic block diagram showing the main components of a mother board of the trusted computing platform of FIG. 1.

As illustrated in FIG. 2, the motherboard 20 of the trusted computing platform 10 includes (among other standard components) a main processor 21, main memory 22, a trusted entity here embodied in the form of trusted device 24 (such as a hardware TPM), a data bus 26 and respective control lines 27 and address lines 28, BIOS memory 29 containing the BIOS program for the platform 10 an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the operating system, in this case Windows XP™, into RAM from hard disk (not shown). Additionally, in operation, the platform 10 loads the processes or applications that may be executed by the platform 10 into RAM from hard disk (not shown).

Typically, in a personal computer, the BIOS program is located in a special reserved memory area, typically the upper 64K of the first megabyte of the system memory (addresses F000h to FFFFh), and the main processor is arranged to look at this memory location first, in accordance with an industry wide standard. A significant difference between the platform and a conventional platform is that, after reset, the main processor is initially controlled by the trusted device 24, which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown). The main processor 21 is initially controlled by the trusted device 24 because it is necessary to place trust in the first measurement to be carried out on the trusted platform. The code for implementing the measuring agent for this first measurement is the aforesaid 'core root of trust of measurement' (CRTM) and is typically trusted at least in part because its provenance is trusted. As already indicated, the main processor 21, when under control of the CRTM, forms the "root of trust for measurement" RTM. As is briefly described below, one role of the RTM is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

According to embodiments of the present invention, the chain of trust is extended by the BIOS and boot-loader by measuring the code that they execute, which typically includes the operating system and certain applications (for example antivirus software and software firewalls that are executed as background processes after power-on, but before users begin to interact with the platform). For example, the measurements would be able to identify if the operating system is an original installation, or whether it has been patched with important security patches, and whether, for example, up-to-date antivirus software has been installed. In effect, the extended chain of trust closely reflects a configuration of the platform; that is, it provides a so-called configuration specification of the platform, which is presented as described by the TCG as a list of Platform Configuration Registers (PCRs), and has the abstract form:

$$cs_x := (PCR_0, \ldots, PCR_n).$$

It will be appreciated that this definition of a configuration specification is particular to the TGC and that it is only one example of a potentially large number of different ways to define a configuration of computing platforms of varying kinds. Accordingly, other aspects and embodiments of the invention may rely on one or more additional or different definition(s) of what constitutes a configuration or configuration specification, and use of the term configuration specification hereafter, unless the context dictates that the specific TCG definition is intended, imports a broader meaning than just the TCG definition.

Each particular configuration specification $cs_x$ reflects certain properties or characteristics of a respective computing platform and is indicative of how the platform is expected to behave, and how secure it is, during interactions with remote or indeed local users. Many properties to do with trust are known and can be envisaged. Some such properties, for example, may state that a computing platform has built-in measures conform to privacy laws, that it strictly separates processes from each other (e.g. encapsulation or compartmentalisation), and/or that it has built-in functionalities to provide Multi-Level Security (MLS), and so on.

By way of example, properties to do with trust are commonly dictated by operating system choice and configuration. For example, one operating system may be intrinsically secure against a known threat, whereas another may not be. The latter, however, may be upgradeable, for example by applying a security patch, to overcome the particular weakness. A remote user may be happy to interact with a computing platform which operates under either the former operating system or the latter operating system (as long as it has been patched), without caring which operating system is in use. In another example, a computing platform may be protected against a recent computer virus using one of several antivirus software applications (such as ZoneAlarm™, Norton Antivirus™ or McAfee VirusScan™: assuming each has up-to-date definition files). Accordingly, a property of the computing platform is that it will not be susceptible to attack from that virus, and a remote user may be happy to interact with such a computing platform, without requiring to know which anti-virus application is in use, as long as it can be convinced that a reliable and up-to-date antivirus application is being used.

In contrast, many banks provide banking software for only one operating system and some music players expect a specific operating system. That is, the banks or music players care about configuration rather than property. Knowledge of the configuration specification reveals a significant amount of information about the hardware and software configuration of a platform, which makes malicious attacks far easier.

After system reset, the trusted device 24 performs an authenticated boot process to ensure that the operating state of the platform 10 is recorded in a secure manner. During the authenticated boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Figure 3:
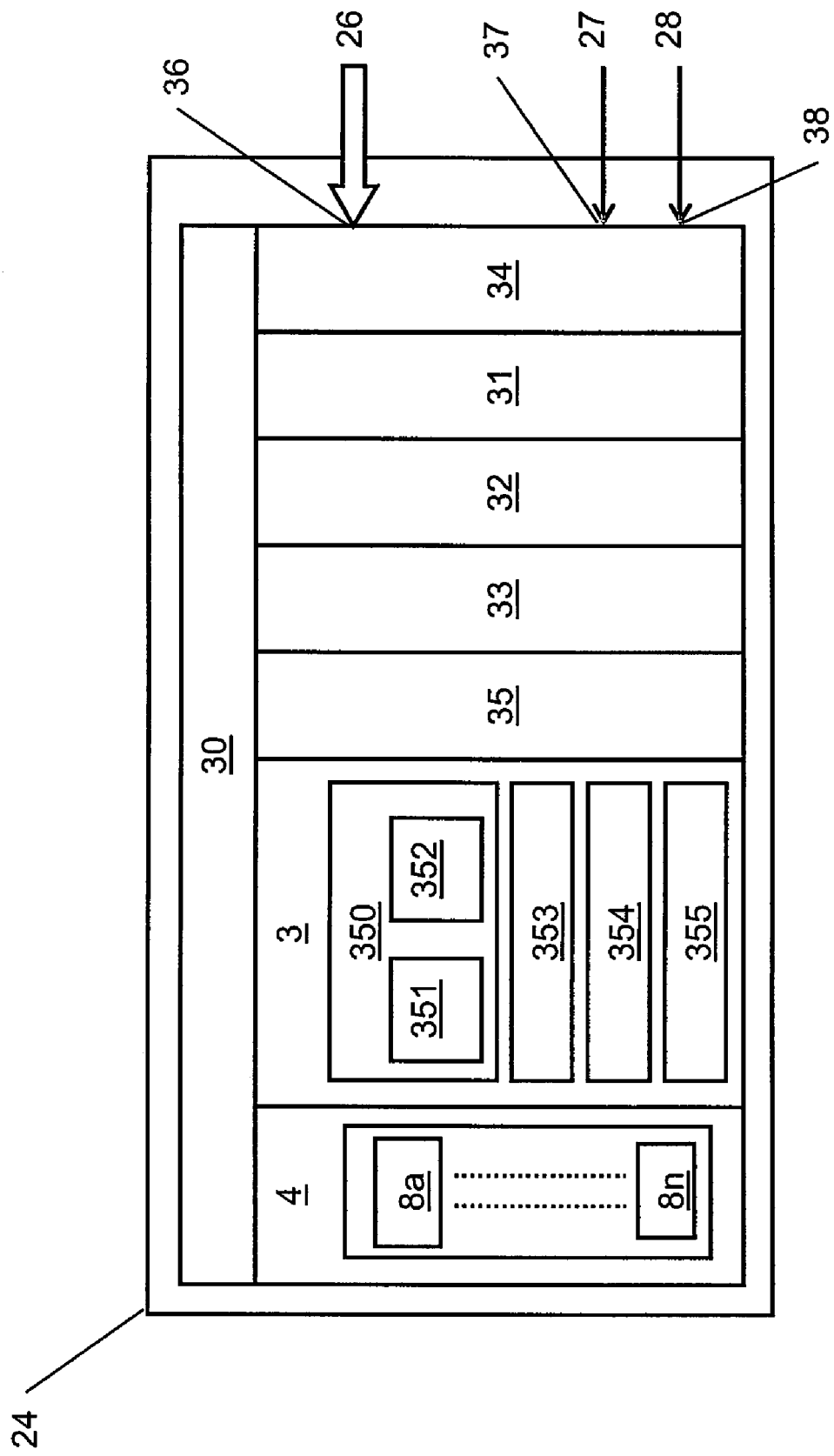
FIG. 3 is a schematic block diagram of a trusted device according to embodiments of the present invention

The trusted device 24 comprises a number of functional blocks, as illustrated in FIG. 3. Specifically, the trusted device 24 in this embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor 21; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Further, according to the present embodiment, the trusted device 24 includes a function 35 for generating a "commitment" of a message, and signing the commitment (rather than the message itself), as will be described in detail below.

Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail. As already indicated, at least some functions of a trusted entity may actually be implemented in software and in the present embodiment, part of the proposed algorithm is enacted by a software process, called a "host".

One item of data that is preferably stored in the non-volatile memory 3 of the trusted device 24 is a certificate 350. The certificate 350 contains at least a public key 351 of the trusted device 24 and an authenticated value 352 of the platform integrity metric measured by a TP. The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 3 also contains an identity (ID) label 353. The ID label 353 is a conventional ID label, for example a serial number, which is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, a first integrity metric is acquired by the measurement function 31 in a process involving the generation of a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted, and the presence and/or state of these may be included in the extended chain of trust.

The measurement function 31 has access to: non-volatile memory 3 for storing a hash program 354 and a private key 355 of the trusted device 24, and volatile memory 4 for storing acquired integrity metrics. A trusted device 24 has limited memory, yet it may be desirable to store information relating to a large number of integrity metric measurements. This is done in trusted computing platforms, as described by the TCG, by the use of PCRs $8a$-$8n$, which have already been mentioned. The trusted device has a number of PCRs of fixed size (the same size as a digest)—on initialisation of the platform, these are set to a fixed initial value. Integrity metrics are then "extended" into PCRs by a process shown in FIG. 4. The PCR $8i$ value is concatenated 403 with the input 401 which is the value of the integrity metric to be extended into the PCR. The concatenation is then hashed 402 to form a new 160 bit value. This hash is fed back into the PCR to form its new value. In addition to the extension of the integrity metric into the PCR, to provide a clear history of measurements carried out the measurement process may also be recorded in a conventional log file (which may be simply in main memory of the computer platform). For trust purposes, however, it is the PCR value that will be relied on and not the software log.

Figure 5:
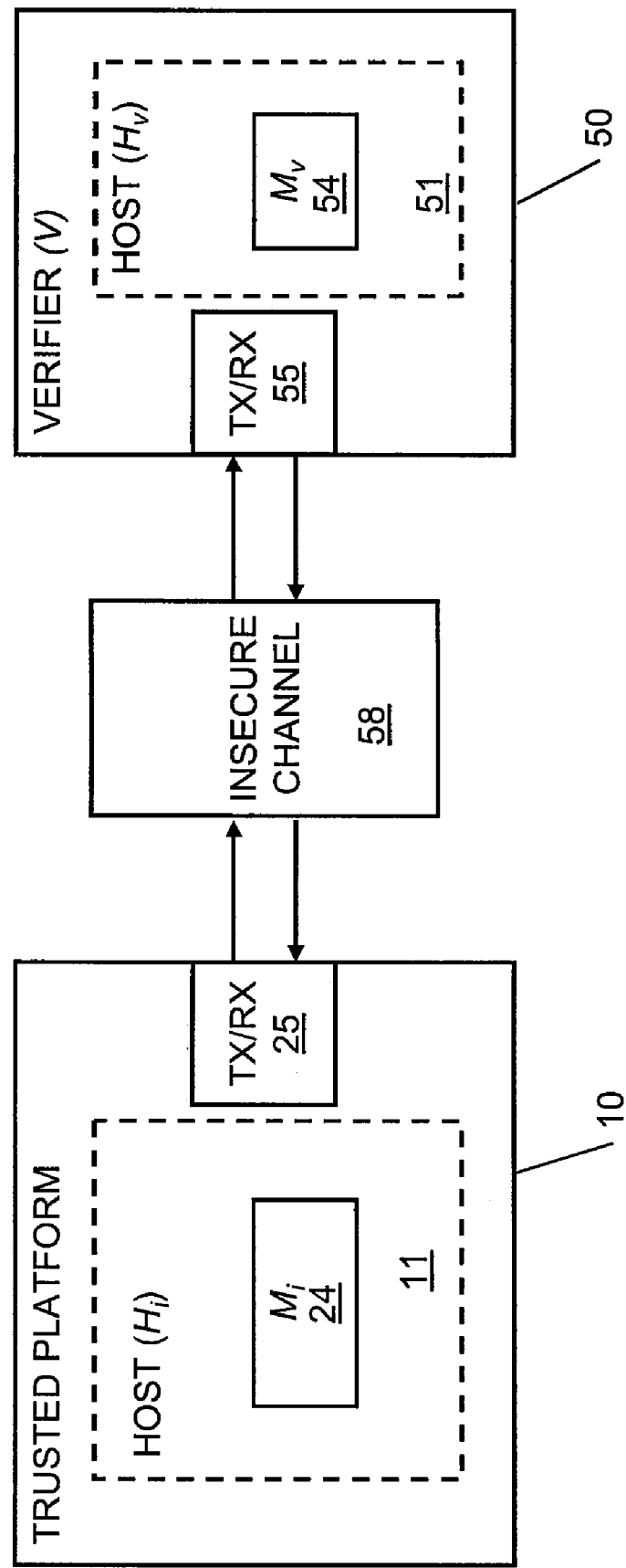
FIG. 5 is a schematic diagram of a system including a trusted computing platform and a verifier computing platform according to an embodiment of the present invention.

Embodiments of the present invention will now be described in the context of a system as shown in FIG. 5. The system comprises a trusted platform 10 as described herein, which communicates with a verifier V 50 via an insecure communications channel 58, for example the Internet. Other communications channels could be intranets, virtual private networks or point to point connections, to name only a few. The verifier V may also be a trusted computing platform as described herein. The trusted platform 10 has executing on it a host process $H_i$ 11, which may be the TPM software stack (TSS) or the like, and the host process $H_i$ is arranged to interact with the trusted device $M_i$ 24. The TSS comprises a software specification that provides a standard API for accessing the functions of the TPM. The verifier V 50 also has a trusted host process $H_V$ executing on it and a trusted device $M_V$ 54. The first and second trusted platforms communicate with each other via respective I/O interfaces 25 and 55. In principle, the verifier V does not need to be a trusted platform as such but it does require the capability to generate and verify digital signatures, as will be described below. However, in practice, and in all likelihood, the verifier V will also be a trusted platform, insofar as the host $H_i$ may not be willing to interact with a platform that offers less security.

An exemplary trusted interaction between the host $H_i$ and the verifier V will now be described with reference to the flow diagram in FIG. 6. In this example, a process (not shown) executing on the verifier V wishes to interact with the particular host $H_i$. Accordingly, the verifier V interacts with the host $H_i$ and the host $H_i$ interacts with the trusted device $M_i$, which is an integral part of the host $H_i$.

The trusted interaction uses the following security parameters, where the numbers in brackets indicate an example of the size of the value:

$l_{cs}$ (160): the size of the value of $cs_i$
$l_\emptyset$ (80): the security parameter controlling the statistical zero-knowledge property
$l_H$ (160): the output length of the hash function used for the Fiat-Shamir heuristic
$l_\Gamma$ (80): the security parameter needed for the reduction in the proof of security
$l_P$ (1632): the size of the modulus P
$l_Q$ (160): the size of the order Q of the sub group of $\mathbb{Z}^*_P$
$\mathcal{H}$: a collision resistant hash function $\mathcal{H}: \{0,1\}^* \to \{0,1\}^{l_\mathcal{H}}$
$H_\Gamma(\bullet)$ and Hash$(\bullet)$: two collision resistant hash functions $H_\Gamma(\bullet): \{0,1\}^* \to \{0,1\}^{l_\Gamma+l_\emptyset}$ and Hash$(\bullet): \{0,1\}^* \to \{0,1\}^{l_\mathcal{H}}$ Of these security parameters, $l_P$ and $l_Q$ are chosen such that in the subgroup of $\mathbb{Z}^*_P$ of order Q, with P and Q being primes satisfying $2^{l_Q} > Q > 2^{l_Q-1}$ and $2^{l_P} > P > 2^{l_P-1}$, the discrete logarithm problem has acceptable computational difficulty. The discrete logarithm problem means computing the value x given the values (g, P, Q, y), where g is a generator of the subgroup of $\mathbb{Z}^*_P$ of order Q, and $y = g^x \mod P$.

In the following process, both the host $H_i$ and the verifier V have a common input comprising (g, h, P, Q, cs, $vk_M$). In addition, the trusted device $M_i$ applies its secret key $sk_M$.

Figure 6:
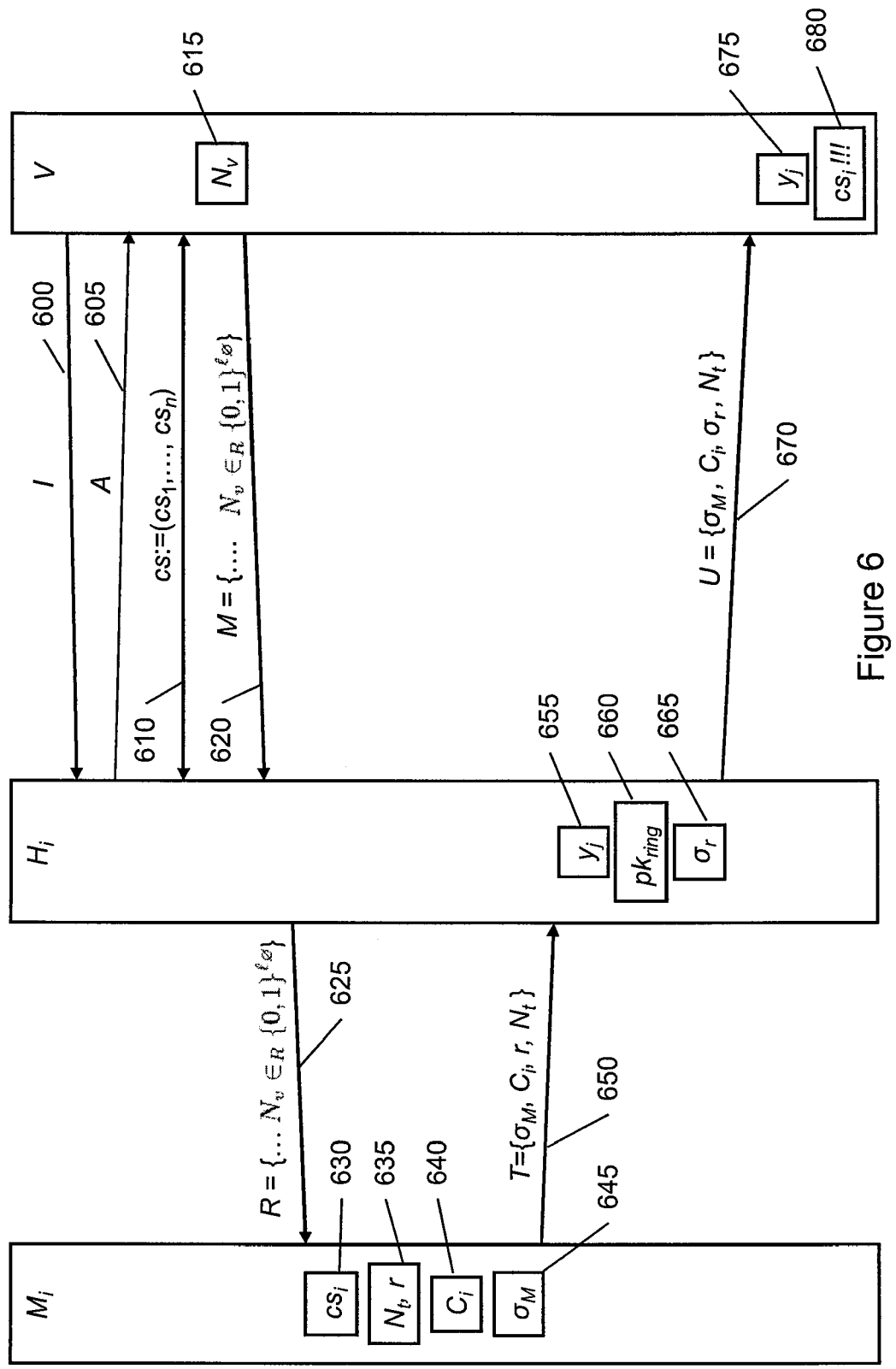
FIG. 6 is a process flow diagram illustrating the steps involved in initiating a trusted interaction between the trusted computing platform and the verifier computing platform of FIG. 5.

In a first step 600, according to the flow diagram in FIG. 6, the verifier V indicates is desire to initiate an interaction with the host $H_i$ by sending an initiation message I to the host. The host receives the message I and, if it is willing and able to interact, sends an approval message A to the verifier, in step 605. Next, in step 610 the host $H_i$ and verifier V agree on, or identify, a set cs of configuration specifications that are deemed to be trusted. This step may take several communications back and forth.

In some cases, as has already been described, the configuration specifications may be selected for providing a specific property or properties that are required by the verifier, such as providing built-in measures that conform to privacy laws. In some embodiments, a configuration specification may be selected, in addition or alternatively, for providing a more general class of security level and/or properties, for increasing confidence that security will be higher as a result. For example, a verifier may require that any system that it is willing to interact with must have a secure operating having a security kernel based on a micro-kernel architecture. This may be required without regard to any particular property that is associated with such an operating system (although, of course, such an operating system will intrinsically exhibit a number of desirable properties). Thus, appropriate configuration specifications may be selected without a strong link, or indeed any link, with any particular property (at least in the mind of the remote user). As long as there is a choice of alternative operating systems having a security kernel based on a micro-kernel architecture, plural respective configuration specifications can be agreed on and the anonymity of the actual operating system chosen can be preserved according to embodiments of the present invention.

In practice, the verifier V may specify which configuration specifications it is willing to trust. In any event, the verifier V and host $H_i$ have to agree to a set cs of configuration specifications for their purposes, and that set must, of course, include the actual configuration specification $cs_i$ (where the index i is from the index set I:={1, 2, 3, ..., n}) of the trusted platform 10. From the perspective of the verifier V, each of the trusted configuration specifications in the set cs would have to be acceptable. From the perspective of the host $H_i$, there has to be a sufficient number of configuration specifications in the set to ensure that the host is able to maintain anonymity for its configuration specification.

After the set cs of configuration specifications has been agreed, the verifier V continues in a next step 615 by generating a nonce $N_v$ and a message M, which it sends to the host $H_i$ in a step 620. The message M includes a nonce $N_v$, where:

$$N_v \in_R \{0,1\}^{l_\emptyset}$$

The nonce $N_v$ is generated to be used by the host $H_i$ in subsequent interactions with the verifier V, so that the verifier can be sure that messages received from the host are new rather than being replays of earlier messages. In other words, according to the present embodiment, the verifier V has to be sure that the response from the host $H_i$ is a fresh response to a specific challenge. Although it is typically desirable to know that a response is not a replay, the step of providing the nonce for this purpose is not essential in this or in other embodiments.

The host $H_i$ receives the nonce $N_v$ and, in a next step 625, sends the nonce $N_v$ to the trusted device $M_i$ with a request message R to initiate a PBA procedure. In a step 630, the trusted device $M_i$ then retrieves the stored configuration specification $cs_i$ from a platform configuration registers and, in a step 635, generates random numbers $N_t$ and r, which are stored in volatile memory 4 of the trusted device $M_i$ 24, where:

$$N_t \in_R \{0,1\}^{l_\emptyset}$$

$$r \in_R \{0,1\}^{l_Q}.$$

Next, in a step 640, the trusted device $M_i$ computes a commitment $C_i$, which is a commitment by the host $H_i$ to its configuration specification $cs_i$, where:

$$C_i := g^{cs_i} h^r \bmod P.$$

In the commitment $C_i$, g and h are generators of a subgroup of $\mathbb{Z}^*_P$ of order Q, and r is a random number, $1<r<Q$. As described before, the discrete logarithm problem in this subgroup is computationally hard. The condition of the values g and h is that the discrete logarithm relation between the values g and h is not known to the entity making this commitment. To guarantee this condition, these two values are computed from a random number, say b, by using a hash-function, say H, for example, $g=H(b\|0)^{P-1/Q} \bmod P$ and $h=H(b\|1)^{P-1/Q} \bmod P$.

The commitment $C_i$ provides evidence that the configuration specification $cs_i$ is a trusted configuration specification of the set cs, without disclosing the details of the configuration specification. The commitment $C_i$ is used in subsequent steps of the present process and acts as an assurance to the verifier V that the configuration specification does not change during the interaction.

Next, in a step 645, the trusted device $M_i$ uses its secret key $sk_M$ to compute a signature $\sigma_M$, where:

$$\sigma_M := \text{TPMSign}(a\|P\|Q\|g\|h\|C_i\|N_v\|N_t)$$

where a, optionally, is provided by $M_i$ to indicate which kind of TPM signature scheme (such as a DAA signature scheme or an ordinary signature scheme) is used for generating TPMSign( ) and what the system parameters are used in signing.

The secret key $sk_M$ has a public key counterpart, $vk_M$. The signature $\sigma_M$ can be calculated in a number of ways, depending on whether the host wishes to remain anonymous. If anonymity is required by the host, then the host may apply a Direct Anonymous Attestation scheme (DAA), as described in E. Brickell, J. Camenisch, and L. Chen. "Direct anonymous attestation", in Proceedings of 11th ACM Conference on Computer and Communications Security, pages 132-145, ACM press, October 2004. This scheme has been adopted by the TCG and the details of it are not necessary for fully understanding the present invention, so DAA will not be described in detail herein. The signature may be a straight DAA signature $\sigma_M$=DAA_sig or a DAA signature on an arbitrary attestation signing key AIK plus an ordinary signature under the key AIK, that is $\sigma_M$=DAA_sig+Sign( ). However, for simplicity of description only herein, the signatures will not be distinguished and the private key used to create $\sigma_M$ is denoted $sk_M$ and the public key used to verify $\sigma_M$ is denoted $vk_M$.

Finally, in a step 650, the trusted device $M_i$ returns a message T including the signature $\sigma_M$, accompanied by the values $C_i$, r and $N_t$, to the host $H_i$. In due course, the verifier V will be able to use part of this information to verify that the commitment has originated from a trusted source.

Thus, in summary, the trusted device has received the (optional) nonce $N_v$ from the verifier V, via the host $H_i$, and has computed a commitment $C_i$ of $cs_i$, which it has then signed, using its private or 'secret' key $sk_M$, to produce trusted device signature $\sigma_M$, and has returned the signature to the host $H_i$.

The host $H_i$ is then able to perform the following steps in order to complete the proof. First, in a step 655, the host $H_i$ computes a series of "cryptographic keys" $y_j$, as follows:

$$y_j := C_i / g^{cs_j} \bmod P \text{ for } j=1, 2, \ldots, n.$$

As can be seen, the keys are generated for each (or at least some) of the configuration specifications $cs_i$ of the set of agreed and trusted configuration specifications cs, using the value of the computed commitment $C_i$. In general, the host $H_i$ would typically prefer a large set of keys, to increase the anonymity, and the verifier V would prefer a smaller set of keys, as the degree of anonymity would be reduced. In any event, the host $H_i$ and verifier V must agree on the set of keys to use; the minimum number being two keys to provide a minimum degree of anonymity.

Then, in a step 660, the host $H_i$ generates a ring signature $\sigma_r$, on $N_v$ under the public keys $pk_{ring}$, where:

$$pk_{ring} := (h, y_j, j=1, 2, \ldots, n).$$

According to the present embodiment, the ring signature is generated using the scheme described in M. Abe, M. Ohkubo, and K. Suzuki. "1-out-of-n signatures from a variety of keys", Proceedings of Advances in Cryptology—ASIACRYPT 2002, LNCS vol. 2501, pages 415-432. Springer-Verlag, 2002. The scheme is described in brief hereinafter. Other ways of calculating ring signatures are known, for example R. Rivest, A. Shamir and Y. Tauman, "How to leak a secret", Advances in Cryptology—ASIACRYPT 2001, LNCS 2248, pp. 552-565, Springer-Verlag, 2001, and the present invention is not limited to any particular scheme. Ring signatures are known in the context of proving that a party is a member of a defined group, without disclosing the identity of the party.

Next, in a step 670, the host $H_i$ sends the ring signature $\sigma_r$, accompanied by the signed commitment $\sigma_M$ and the commitment $C_i$, to the verifier V in a message U. In this case, providing the data relating to the properties of the first computing entity and to the other properties of the set, in effect, obscures from the second computing entity which properties the first computing entity has.

In a step 675, the verifier V uses this information to verify the proof by using the public key $vk_M$ to verify $\sigma_M$, whereby it is able to accept the value of the commitment $C_i$, and then compute a series of cryptographic keys $y_j$, as follows:

$$y_j := C_i / g^{cs_j} \bmod P, j=1, 2, \ldots, n.$$

It will be appreciated that this is the same calculation that was carried out by the host $H_i$ in order to generate its series of cryptographic keys. The keys are generated for each configuration specification $cs_i$ of the set of agreed and trusted configuration specifications cs, using the value of the computed commitment $C_i$.

Finally, the verifier V is able to accept $cs_i$ by verifying $\sigma_r$, without knowledge of the value of i. In other words, the verifier V is convinced that the commitment $C_i$ is true, and that the configuration specification $cs_i$ of the host $H_i$ is trusted, by being a member of the set of trusted configurations cs, but without knowing the actual configuration specification of the host.

Thus, PBA has been achieved without the need for a trusted third party, which can simplify the overall attestation process. In summary, an advantage of embodiments of the present invention, compared with prior art methods, is that there is no need to disclose actual properties, or to use a trusted third party, to certify that the properties of a computing entity are trusted (although trusted third parties may be employed if desired). This latter point in particular can improve the efficiency and security of the interactions between the two computing entities compared with known prior art techniques. Additionally, in embodiments that employ a trusted device such as a TPM, the device itself would not need to be adapted significantly from known devices to provide additional functions, compared with the overhead of having to interact with a TTP, which is an alternative way of achieving PBA. The additional work, as described above, comprises choosing r, and computing and signing a commitment to a configuration specification rather than signing the configuration specification itself.

Furthermore the proposed solution to the problem of attestation has an advantageous property that the set of trusted configuration specifications $cs_i$ may be flexibly created, or created in near real time, as part of the agreement and interactions between the host and the verifier. In addition, as the size of the set $cs_i$ increases, even greater property attestation anonymity is assured.

One way of calculating a ring signature, in accord with the aforementioned paper by M. Abe et al, will now be described.

In a key generation step, k is a selected security parameter. On input of $1^k$, the values g, P and Q are created. As mentioned before, g is a generator of a subgroup of $Z^*_P$ of order Q, and the discrete logarithm problem in this subgroup is hard.

A potential signer $S_i$ (i=1, ..., t) chooses $x_i$ and computes $y_i$ according to:

$$x_i \in_R \{0,1\}^{\ell_Q}$$

$$y_i = g^{x_i} \bmod P.$$

Thus, the public key (g, P, Q, $y_i$) and the private or secret key $x_i$ can be output.

For the purposes of signing, a signer who owns secret key $x_i$ can generate a ring signature on a message m with a list of public keys (h, P, Q, $y_j$), where (j=1, ..., t), and i∈{1, ..., t}. In the present embodiment, the value $x_i$ is the value r and the owner of this value is the host $H_i$. The other t−1 $x_j$ values are not known to anybody, who does not know the discrete logarithm relation between the values g and h. The steps for generating the ring signature are:

(a) Choose $\alpha, c_j \in_R \{0,1\}^{\ell_Q}$ for j=1, ..., t, j≠i
(b) Compute $z = h^{\alpha} \Pi^t_{j=1, j \neq i} y_j^{c_j} \bmod P$
(c) Compute $c = \text{Hash}(h\|P\|Q\|y_1\| \ldots \|y_t\|m\|1)$
(d) Compute $c_i = c - (c_1 + \ldots + c_{i-1} + c_{+1} + \ldots + c_t) \bmod Q$
(e) Compute $s = \alpha - c_i \cdot x_i \bmod Q$
(f) Output the signature $\sigma_r = (s, c_1, \ldots c_n)$ Finally, a verifier can verify that the tuple $\sigma_r$ is a ring signature on message m (which is the challenge $N_v$ according to the embodiment above) by checking that:

$$\Sigma^t_{i=1} c_i = \text{Hash}(h\|P\|Q\|y_1\| \ldots \|y_t\|m\|h^s y_1^{c_1} \ldots y_t^{c_1})$$

This will only be the case if the quantity z computed by the host $H_i$ is equal to the quantity $(h^s y_1^{c_1} \ldots y_t^{c_1})$ computed by the verifier V. As both quantities include: $\Pi^t_{i=1, j \neq i} y_i^{c_j}$, whether the quantities are equal is dependent on whether:

$$h^{\alpha} \equiv h^s y_i^{c_i}$$
$$\equiv h^{(\alpha - c_i r)} y_i^{c_i}$$
$$\equiv (h^{\alpha} \cdot y_i^{c_i}) / h^{c_i r}$$

which will only be true if:

$$y_i = h^r$$

that is, if the value $cs_i$ used in computing the commitment $C_i$ is the same as used by the verifier V in computing one of the keys $y_j$. Thus, testing:

$$\Sigma^t_{i=1} c_i = \text{Hash}(h\|O\|Q\|y_1\| \ldots \|y_t\|m\|h^s y_1^{c_i} \ldots y_t^{c_1})$$

is effectively a test as to whether the commitment $C_i$ has been formed from one of the values of $cs_i$ in the original set of configuration specifications.

The anonymity of which particular configuration specification has been used in the commitment $C_i$ is, however, maintained.

The above embodiments are to be understood as illustrative examples of the invention. Further embodiments of the invention are envisaged. For example, embodiments of the invention do not require use of a trusted platform implementing the TCG specifications or indeed to trusted platforms at all (all that is needed is a computing entity capable of creating and signing a commitment and forming ring signature).

In addition, instead of using a ring signature scheme, it is expected that other kinds of proofs based on other cryptographic primitives may be adapted to be used according to embodiments of the present invention. The class of Zero-knowledge proofs of knowledge (or simply 'zero knowledge proofs'), and within that class discrete logarithm proofs, of which the ring signature scheme above is an example, find application in general in embodiments of the present invention. Zero knowledge proofs are interactive protocols carried out between two parties: a prover and a verifier. During such a protocol run, a verifier is convinced with overwhelming probability that the prover is aware of some secret and that a certain predicate related to this secret is true. However, the verifier does not learn anything beyond this assertion.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of demonstrating to a second computing entity that a first computing entity has a trusted configuration specification, the method comprising:
  (a) the computing entities agreeing on a set of trusted configuration specifications, including a configuration specification of the first computing entity;
  (b) the first computing entity providing the second computing entity with evidence that its configuration specification is a member of the set, said evidence comprising a computed commitment, made using (but not revealing) the configuration specification of the first computing entity, and a ring signature generated using a plurality of keys, each key being generated using the commitment and one of the trusted configuration specifications, of which one key is generated using the commitment and the configuration specification of the first computing entity; and
  (c) the second computing entity verifying the ring signature in order to convince itself that the configuration specification of the first computing entity is in the set, wherein
  step (b) comprises the first computing entity:
    (x) digitally signing a quantity based on a secret and a said configuration specification possessed by the first computing entity, the configuration specification possessed by the first computing entity not being identifiable from said quantity;
    (y) forming the ring signature based on the use of one private key and multiple public keys, said private key using said secret and said public keys being formed from respective ones of the configuration specifications of said set; and
    (z) sending the digitally signed quantity and the ring signature to the second computing entity.

2. A method according to claim 1, wherein step (b) comprises a zero knowledge proof.

3. A method according to claim 1, wherein step (b) comprises a discrete logarithm proof.

4. A method according to claim 1, wherein step (x) is effected by a trusted entity of the first computing entity.

5. A physical computing platform, which is configured to generate evidence to convince a computing entity that the computing platform has a configuration specification, in an agreed set of trusted configuration specifications, by revealing evidence, said evidence comprising a computed commitment, made using (but not revealing) the configuration specification of the computing platform, and a ring signature generated using a plurality of keys, each key being generated using the commitment and one of the trusted configuration specifications, of which one key is generated using the commitment and the configuration specification of the computing platform, to demonstrate to the computing entity that a said configuration specification of the computing platform is in the agreed set, wherein
the computing platform, in response to a request from another the computing entity, is arranged configured to:
  (a) digitally sign a quantity based on a secret and a said configuration specification possessed by the computing platform, the configuration specification possessed by the computing platform not being identifiable from said quantity;
  (b) form the ring signature based on the use of one private key and multiple public keys, said private key using said secret and said public keys being formed from respective ones of the configuration specifications of said set; and
  (c) send the digitally signed quantity and the ring signature to the computing entity.

6. A computing platform according to claim 5, comprising a host application and a trusted entity.

7. A computing platform according to claim 6, wherein the trusted entity includes a function for signing a commitment to the platform having a said configuration specification.

8. A computing platform according to claim 5, wherein the evidence conveys a zero knowledge proof.

9. A computing platform according to claim 5, wherein the evidence conveys a discrete logarithm proof.

10. A computing platform according to claim 5, wherein step (a) is effected by a trusted entity of the computing platform.

11. A system comprising first and second physical computing entities, each one being configured to communicate with the other via a communications medium, the first and second computing entities being configured to interact to agree on a set of trusted configuration specifications including a configuration specification of the first computing entity, the first computing entity being configured to impart to the second computing entity evidence concerning configuration specifications of the set including a said configuration specification of the first computing entity, without revealing the configuration specification of the first computing entity to the second computing entity, for demonstrating to the second computing entity that a said configuration specification of the first computing entity is in the set of trusted configuration specifications, said evidence comprising a computed commitment, made using (but not revealing) the configuration specification of the first computing entity, and a ring signature generated using a plurality of keys, each key being generated using the commitment and one of the trusted configuration specifications, of which one key is generated using the commitment and the configuration specification of the first computing entity, wherein
the first computing entity is configured to impart the evidence using a method including:
  digitally signing a quantity based on a secret and a said configuration specification possessed by the first computing entity, the configuration specification possessed by the first computing entity not being identifiable from said quantity;
  forming the ring signature based on the use of one private key and multiple public keys, said private key using said secret and said public keys being formed from respective ones of the configuration specifications of said set; and
  sending the digitally signed quantity and the ring signature to the second computing entity.

12. A system according to claim 11, wherein the first computing entity is a computing platform which is configured to generate evidence to convince the second computing entity that the computing platform has a configuration specification, in an agreed set of trusted configuration specifications, by revealing evidence, said evidence comprising a computed commitment, made using (but not revealing) the configuration specification of the first computing entity, and a ring signature generated using a plurality of keys, each key being generated using the commitment and one of the trusted configuration specifications, of which one key is generated using the commitment and the configuration specification of the first computing entity, to demonstrate to the second computing entity that a said configuration specification of the computing platform is in the agreed set.

13. A trusted device comprising a circuit configured to sign a computed commitment in evidence that is provided to convince a computing entity that a computing platform containing the trusted device has a configuration specification in an agreed set of trusted configuration specifications, the commitment being made using (but not revealing) the configuration specification of the computing platform, the circuit configured to sign the commitment using a process including:
  digitally signing a quantity based on a secret and the configuration specification of the computing platform, the configuration specification of the computer platform not being identifiable from said quantity; and
  forming a ring signature based on the use of one private key and multiple public keys, said private key using said secret and said public keys being formed from respective ones of the trusted configuration specifications of the agreed set, wherein the ring signature is generated using a plurality of keys, each key being generated using the commitment and one of the trusted configuration specifications, of which one key is generated using the commitment and the configuration specification of the computing platform.

14. The trusted device of claim 13, wherein the trusted device comprises a trusted platform module.

* * * * *

UNITED STATES PATENT AND TRADEMARK OFFICE
CERTIFICATE OF CORRECTION

PATENT NO. : 8,261,332 B2
APPLICATION NO. : 12/169113
DATED : September 4, 2012
INVENTOR(S) : Liqun Chen et al.

Page 1 of 1

It is certified that error appears in the above-identified patent and that said Letters Patent is hereby corrected as shown below:

In column 15, line 20, in Claim 5, before "the computing" delete "another".

In column 15, line 20, in Claim 5, after "entity, is" delete "arranged".

Signed and Sealed this
Fifth Day of February, 2013

Teresa Stanek Rea
*Acting Director of the United States Patent and Trademark Office*